US009242237B2

(12) United States Patent
Monereau

(10) Patent No.: US 9,242,237 B2
(45) Date of Patent: Jan. 26, 2016

(54) ZEOLITE COMPOSITION ADAPTED FOR AIR PURIFICATION

(75) Inventor: Christian Monereau, Montpellier (FR)

(73) Assignee: L'Air Liquide, Société Anonyme pour l'Etude et l'Exploitation des Procédés Georges Claude, Paris (FR)

(*) Notice: Subject to any disclaimer, the term of this patent is extended or adjusted under 35 U.S.C. 154(b) by 112 days.

(21) Appl. No.: 13/978,235

(22) PCT Filed: Jan. 4, 2012

(86) PCT No.: PCT/EP2012/050090
§ 371 (c)(1),
(2), (4) Date: Jul. 3, 2013

(87) PCT Pub. No.: WO2012/093141
PCT Pub. Date: Jul. 12, 2012

(65) Prior Publication Data
US 2013/0269524 A1 Oct. 17, 2013

(30) Foreign Application Priority Data
Jan. 7, 2011 (FR) ..................................... 11 50122

(51) Int. Cl.
B01D 53/02 (2006.01)
B01J 29/80 (2006.01)
B01D 53/04 (2006.01)

(52) U.S. Cl.
CPC ................. B01J 29/80 (2013.01); B01D 53/02 (2013.01); B01D 53/0462 (2013.01);
(Continued)

(58) Field of Classification Search
CPC .... B01D 53/02; B01D 53/04; B01D 53/0431; B01D 53/0462; B01D 2253/108; B01D 2257/402; B01D 2257/504; B01J 29/80; Y02C 10/08; Y02C 20/10
USPC ............. 95/90, 115, 129, 139, 143, 144, 900, 95/902; 96/108, 121, 153; 502/67, 79
See application file for complete search history.

(56) References Cited

U.S. PATENT DOCUMENTS 3,738,084 A 6/1973 Simonet et al.
4,233,038 A 11/1980 Tao
(Continued)

FOREIGN PATENT DOCUMENTS

EP 0963777 A2 12/1999
EP 1101521 A1 5/2001
(Continued)

OTHER PUBLICATIONS

FR 1150122, French Search Report and Written Opinion, Aug. 10, 2011.
(Continued)

Primary Examiner — Frank Lawrence
(74) Attorney, Agent, or Firm — Elwood L. Haynes

(57) ABSTRACT

The invention relates to an adsorbent zeolite-based material comprising for 100 mass %: an amount different from zero of a zeolite selected from X zeolites or LSX zeolites; the balance up to 100 mass % consisting of an amount different from zero of a cation-exchanged zeolite, said cation-exchanged zeolite being selected from cation-exchanged X zeolites and cation-exchanged LSX zeolites.

11 Claims, 1 Drawing Sheet

(52) U.S. Cl.
CPC ...... *B01D 53/0431* (2013.01); *B01D 2253/108* (2013.01); *B01D 2257/402* (2013.01); *B01D 2257/504* (2013.01); *Y02C 10/08* (2013.01); *Y02C 20/10* (2013.01)

(56) References Cited

U.S. PATENT DOCUMENTS

| | | | |
|---|---|---|---|
| 4,957,514 A | 9/1990 | Golden et al. | |
| 5,531,808 A | 7/1996 | Ojo et al. | |
| 5,587,003 A | 12/1996 | Buelow et al. | |
| 5,604,169 A * | 2/1997 | Leavitt | 502/60 |
| 5,744,103 A * | 4/1998 | Yamada et al. | 422/171 |
| 5,885,331 A | 3/1999 | Reiss et al. | |
| 6,409,800 B1 | 6/2002 | Ojo et al. | |
| 6,432,171 B1 | 8/2002 | Kumar et al. | |
| 6,616,732 B1 | 9/2003 | Grandmougin et al. | |
| 7,011,695 B2 | 3/2006 | Moreau et al. | |
| 2005/0005766 A1 | 1/2005 | Moreau et al. | |
| 2006/0254420 A1 * | 11/2006 | Monereau et al. | 95/96 |
| 2007/0131589 A1 | 6/2007 | Weston et al. | |

FOREIGN PATENT DOCUMENTS

| | | |
|---|---|---|
| EP | 1214964 A2 | 6/2002 |
| FR | 2363069 A1 | 3/1978 |
| FR | 2925367 A1 | 6/2009 |

OTHER PUBLICATIONS

PCT/EP2012/050090, International Search Report, Apr. 4, 2012.

* cited by examiner

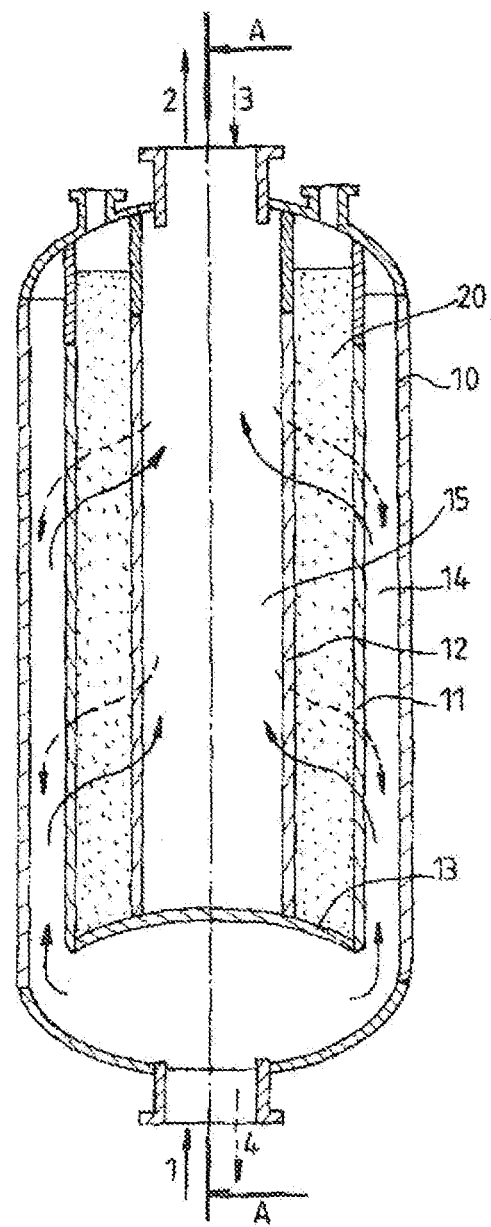

ZEOLITE COMPOSITION ADAPTED FOR AIR PURIFICATION

CROSS-REFERENCE TO RELATED APPLICATIONS

This application is a §371 of International PCT Application PCT/EP2012/050090, filed Jan. 4, 2012, which claims §119(a) foreign priority to French patent application 1150122, filed Jan. 7, 2011.

FIELD OF THE INVENTION

The aim of the present invention is to provide a process for the pretreatment or purification of a gas stream composed of atmospheric air, prior to the cryogenic separation of said air, in particular by cryogenic distillation.

It is known that atmospheric air comprises compounds which have to be removed before the introduction of said air into the heat exchangers of the cold box of an air separation unit, in particular the compounds carbon dioxide ($CO_2$), water vapor ($H_2O$), hydrocarbons ($C_nH_m$) and nitrogen oxides.

This is because, in the absence of such a pretreatment of the air in order to remove its $CO_2$ and water vapor impurities therefrom, a condensation and a solidification into ice of these impurities takes place during the cooling of the air to cryogenic temperature, which may result in problems of blocking of the equipment, in particular the heat exchangers, distillation columns, and the like.

In addition, it is also customary to remove the hydrocarbon impurities liable to be present in the air in order to avoid any risk of damage to the equipment, in particular to the distillation column or columns situated downstream of the cold box.

Currently, this pretreatment of the air is carried out, as the case may be, by the TSA (Temperature Swing Adsorption) process, that is to say an adsorption process with variation in temperature, or by the PSA (Pressure Swing Adsorption) process, that is to say an adsorption process with variation in pressure; the term "PSA process" is understood to mean PSA processes proper, VSA (Vacuum Swing Adsorption) processes or VPSA (Vacuum/Pressure Swing Adsorption) processes, that is to say adsorption processes with placing under vacuum during the regeneration.

SUMMARY OF THE INVENTION

The invention essentially relates to the TSA process.
Conventionally, a TSA process cycle for the purification of air comprises the following stages:
a) purification of air by adsorption of the impurities at superatmospheric pressure ($3 \times 10^5$ Pa to $35 \times 10^5$ Pa (3 bar to 35 bar abs)) and at ambient temperature (from 5° C. to 50° C.),
b) depressurization of the adsorber down to atmospheric pressure (indeed even below atmospheric pressure),
c) regeneration of the adsorbent at atmospheric pressure, in particular by residual gases or waste gases, typically impure nitrogen originating from an air separation unit and reheated up to a temperature of greater than 70° C. using one or more heat exchangers,
d) cooling the adsorbent to ambient temperature or below ambient temperature, in particular by continuing to introduce therein said residual gas resulting from the air separation unit but not reheated,
e) repressurization of the adsorber with purified air resulting, for example, from another adsorber which is in the production phase.

Numerous alternative forms can exist according to the downstream process and/or the operating conditions; for example, the cooling stage can be omitted, the repressurization can be carried out with humid air, the regeneration can be carried out at moderate pressure, and the like.

Generally, air pretreatment devices comprise two adsorbers, operating alternately, that is to say that one of the adsorbers is in the production phase while the other is in the regeneration phase.

Such air purification TSA processes are described in particular in the documents U.S. Pat. No. 3,738,084 and FR-A-7725845.

In general, the removal of the $CO_2$ and of the water vapor is carried out on one or more beds of adsorbents, preferably several beds of adsorbents, namely generally a first adsorbent intended to preferentially catch the water, for example a bed of activated alumina, of silica gel or of zeolites, and a second bed of adsorbent for preferentially catching the $CO_2$, for example a zeolite. Mention may in particular be made, on this account, of the documents U.S. Pat. No. 5,531,808, U.S. Pat. No. 5,587,003 and U.S. Pat. No. 4,233,038.

Thus, it is usual to use a zeolite of 13X type to remove the $CO_2$, since zeolite 13X is supposed to be particularly effective in catching small amounts of $CO_2$ and possibly of water as it exhibits a strong and selective affinity for these polar molecules. Furthermore, zeolite X exhibits micropore diameters which are among the largest, which allows it to adsorb with good kinetics molecules with a kinetic diameter of up to 0.8 nm.

However, the zeolite 13X does not make it possible to catch all the harmful molecules liable to be present in a gas stream.

This is because the gas molecules adsorbed by zeolite 13X are essentially and by increasing affinity: methane, ethane, propane, nitrous oxide, ethylene, carbon dioxide, butane, propylene ($C_3H_6$), acetylene ($C_2H_2$), toluene and methylcyclohexane.

It follows that an industrial unit strictly designed to catch carbon dioxide with a standard zeolite 13X only partially catches ethylene, propane and nitrous oxide.

The marketing of LSX with an Si/Al ratio of 1 has made it possible to substantially improve the catching of $CO_2$ but much less the catching of the other impurities cited above.

For its part, the use of calcium- and/or barium-exchanged zeolite has made it possible to improve the catching of ethylene and/or of propane and/or nitrous oxide but at the expense of the catching of $CO_2$.

Subsequently, the term of zeolite X (or NaX or 13X) will be used to refer to a zeolite X, the bulk of the cations of which are sodium cations, and the term of zeolite LSX will be used to refer to, as explained above, a zeolite X with an Si/Al ratio of 1 or approximately 1, the bulk of the cations of which are sodium and/or potassium cations.

Three types of solutions are used today to achieve the desired levels of residual impurities:
Use of a bed of NaX (13X standard) or of LSX overdesigned with respect to the catching of $CO_2$
Use of a double bed of NaX or of LSX, followed by a bed of calcium- or barium-exchanged zeolite
Use of a bed of partially calcium- and/or barium-exchanged zeolite intended to catch $CO_2$, $C_2H_4$, $N_2O$ and $C_3H_8$ up to the required thresholds.
The latter process is illustrated by WO 03/041858.
The main advantage of using a single bed instead of multiple beds is related in large part to the use of radial adsorber.

This is because each type of additional adsorbent results in the presence of an additional separating screen for holding the adsorbents in place, which complicates the manufacture of said adsorbers.

In that way, it is possible to obtain a residual $CO_2$ content of the order of 500 ppb to 100 ppb with degrees of catching of ethylene of 75% to 99%, of propane of 50% to 99% and of $N_2O$ of 65% to 97-98% approximately, according to the type of solution selected.

In view of the contents in the air of the secondary impurities, from a few tens of to a few hundred ppb, the residual amount of these impurities is in absolute terms very low, of the order of a ppb.

Novel low-pressure cryogenic processes or the taking into account of higher levels of safety or reliability are resulting in the wish to limit the total amount of impurities which are introduced into the cryogenic unit.

As the residual water content is for its part very low, it is therefore appropriate to substantially lower the residual content of the $CO_2$, by an order of magnitude, indeed even more.

The three solutions listed above can be adapted to this new situation:
  overdimensioning of the bed of NaX or LSX in order to obtain, let us say, 10 ppb of $CO_2$,
  overdimensioning of the first bed of NaX or LSX,
  overdimensioning of the bed of exchanged zeolite.

These three solutions have their disadvantage: large volume for the first and third solutions with residual contents of secondary impurities ($C_2H_4$, $C_3H_8$, $N_2O$) which are lower than necessary as the dimensioning is carried out for the $CO_2$; double bed for catching the $CO_2$ and the secondary impurities in the second solution with the corresponding complexity in the case of radial adsorber.

Starting from that, a problem which is posed is that of providing an improved process for the purification of air, that is to say which makes it possible to minimize the total volume of adsorbent while retaining a minimum number of beds (1 or 2 maximum) for catching all the impurities, including water, at the level required by the process.

A solution of the present invention is a zeolite-based adsorbent material composed, for 100% by weight:
  of a non-zero proportion of a zeolite chosen from zeolites X or zeolites LSX; and
  the remainder to 100% by weight of a non-zero proportion of a cation-exchanged zeolite, said cation-exchanged zeolite being chosen from cation-exchanged zeolites X or cation-exchanged zeolites LSX.

In the context of the invention, the term "cation-exchanged" is understood to mean that the cations under consideration are those associated with tetrahedral $AlO_2^-$ units of the zeolite (zeolitic phase), which exchanged cations play a role in the mechanism of the adsorption of the gaseous compounds to be removed.

Likewise, the term "exchangeable cations" is understood to mean cations which can be substituted or replaced by other cations by use of an ion-exchange process.

The term "degree of exchange of a cation x" is understood to mean the number of charges carried by the cations X present in the zeolite, with respect to the total number of charges of the combined cations. The degree of exchange varies between 0% and 100%. The total positive charge carried by the cations is equal to the total negative charge carried by the $AlO_2^-$ groups. The stoichiometric amount corresponds to this total charge.

It should be noted that the amounts of zeolites X or LSX and of exchanged zeolites are determined as a function of the level of residual impurities required and of the composition of the air to be purified.

As the case may be, the adsorbent material according to the invention can exhibit one or more of the following characteristics:
  the mixture is formed of particles composed of crystals of zeolite X or LSX and of crystals of cation-exchanged zeolite agglomerated together;
  the mixture is formed of particles of zeolite X or LSX and of particles of cation-exchanged zeolite; the term "particles" is understood to mean solids with dimensions ranging from a few hundred microns to a few millimeters and having varied shapes, preferably short rods, pellets or essentially spherical beads;
  the cation-exchanged zeolite is exchanged by calcium, barium, magnesium, strontium and/or lithium cations, preferably by calcium and barium cations;
  the cation-exchanged zeolite is exchanged from 10 to 90% by calcium cations and from 10 to 90% by barium cations, preferably from 10 to 50% by calcium cations and from 10 to 50% by barium cations and more preferably still from 15 to 40% by calcium cations and from 15 to 40% by barium cations;
  the zeolites X or LSX and the cation-exchanged zeolites are uniformly or virtually uniformly distributed in said material.

Another subject matter of the present invention is an adsorber comprising an adsorbent material according to the present invention.

The adsorber is preferably a radial adsorber.

Furthermore, either the adsorbent material according to the present invention is placed in a single bed; or said adsorber comprises a first bed which makes it possible to remove at least in part the water from a gas stream and a second bed comprising the adsorbent material according to the invention. If the second alternative is chosen, the first bed can comprise activated alumina, silica gel or a sieve (zeolite).

Another subject matter of the present invention is a process for the purification or separation of a gas or of a gas mixture using a zeolite-based adsorbent material composed of a mixture of zeolite X or LSX and of cation-exchanged zeolite according to the invention.

As the case may be, the purification or separation process according to the invention can exhibit one or more of the following characteristics:
  the gas is air, preferably air intended to be fractionated by a cryogenic unit;
  at least a first impurity chosen from $CO_2$, ethylene, propane and $N_2O$ is removed;
  at least a second impurity chosen from water, butane and acetylene is removed;
  said process is a TSA process;
  the adsorption pressure is between 3 and 35 bar abs, preferably between 3 and 10 bar abs, the adsorption temperature is between 5° C. and 50° C., and the adsorption time is between 30 and 480 minutes, preferably between 60 and 180 minutes and more preferably still between 90 and 150 minutes;
  the regeneration temperature is between 70° C. and 200° C., preferably between 100 and 160° C., and the regeneration pressure is less than 5 bar abs, preferably in the vicinity of atmospheric pressure;
  the gas for regeneration of the adsorbent is nitrogen or a mixture of nitrogen and oxygen comprising a low proportion of oxygen (a few % by volume); preferably, the nitrogen/oxygen mixture used to regenerate the adsorbent is a residual gas or a waste gas resulting from a unit for the cryogenic separation of air;

the process of the invention is carried out in at least one adsorber, preferably in at least two adsorbers operating alternately.

The invention also relates to a first process for the manufacture of a zeolite-based adsorbent material composed of a mixture formed of particles composed of crystals of zeolite X or LSX and of crystals of zeolite X or LSX exchanged by calcium and barium cations agglomerated together, in which:

(a) a zeolite X or LSX comprising sodium and/or potassium cations is subjected to at least one exchange of ions by bringing into contact with a solution comprising calcium and/or barium ions, (b) if necessary, stage (a) is repeated until the degree of exchange desired for each of said barium and calcium cations is achieved, (c) crystals of zeolite X or LSX exchanged by calcium and barium cations are recovered;

(d) the crystals of zeolite X or LSX exchanged by calcium and barium cations resulting from stage (c) and crystals of zeolite X or LSX are agglomerated in order to form agglomerated particles, and (e) a heat treatment is carried out in order to dry and activate said particles.

The term "activation" is understood to mean essentially removing, by heating, the water molecules which conceal the active sites, without damaging the crystalline structure of the zeolite. The heating rate, the heating time and the maximum temperature depend on the nature of the zeolite.

In stage (a), a solution of calcium and/or barium salts, such as a chloride solution, at a pH of less than approximately 6, is preferably used to carry out the ion exchanges.

The zeolite and the saline solution are brought into contact, for example, by immersion of the whole of the zeolite in a time as short as possible, in order to provide a homogeneous exchange of ions in the zeolite.

In an alternative form, the powdered zeolite can be placed in stirred suspension in water and then the solution of calcium and/or barium salts can be slowly added, sufficient stirring being carried out in order to distribute the solution throughout the volume in suspension. In all cases, it is necessary to carry out the contacting operation under conditions where the calcium and/or barium salt will be distributed throughout the volume of zeolite, before exchange has had time to take place, in order to ensure that the calcium and/or barium will be homogeneously distributed throughout the body of the zeolite.

The molarities of salt are between 1M and 0.01M, the temperature is between 20° C. and 100° C. and the contact time is between 20 minutes and 3 hours.

In the agglomeration stage (d), the zeolite can be mixed with a binder, such as clay, silica gel or the like.

Finally, the invention relates to a second process for the manufacture of a zeolite-based adsorbent material composed of a mixture formed of particles of zeolite X or LSX and of particles of zeolite X or LSX exchanged by calcium and barium cations, which are uniformly or virtually uniformly distributed in said material.

The mixing of said particles can be carried out continuously or batchwise by passing through a mixer. Preferably, use will be made:

either of a batchwise process, in which:

(a) the particles of zeolite X or LSX and the particles of zeolite X or LSX exchanged by calcium and barium cations are placed in a container comprising a residual empty space of at least 15%, and (b) the container is subjected to rotational movements following an axis different from the axis of symmetry of the container;

or a continuous process, in which the respective amounts of particles of zeolite X or LSX and the particles of zeolite X or LSX exchanged by calcium and barium cations are simultaneously introduced into an inline mixer and the mixture is subsequently sent to an intermediate storage facility (silo) or to the delivery containers (drums, big bags).

The invention will now be described in the case of a single-bed radial adsorber, that is to say that a single bed composed of an adsorbent material having a homogeneous composition is used to catch water, $CO_2$, acetylene, ethylene, propane, butane and $N_2O$ until the required residual content is achieved. This charge can also catch traces of other compounds, such as some acid gases or other easily adsorbable compounds possibly present, even accidentally, in air ($NH_3$, combustion residues, VOCs, and the like). Among the normal impurities cited, water is preferentially adsorbed and acetylene and butane are also completely caught on such a charge.

Traces of methane and ethane may end up in the dried and decarbonated gas but do not present a particular problem in the cryogenic separation unit.

The choice of the adsorbent charge will thus depend on the respective contents of $CO_2$, $C_2H_4$, $C_3H_8$ and $N_2O$ in the air and on the residual contents required at the inlet of the cryogenic unit in order to operate the latter with complete reliability and in complete safety.

BRIEF DESCRIPTION OF THE FIGURES

FIG. 1 is a schematic representation of one embodiment of the present invention.

DETAILED DESCRIPTION OF THE INVENTION

The operation of a radial adsorber comprising such an adsorbent charge is represented in FIG. 1.

The fluid to be purified 1 comprising the impurities mentioned above goes into the bottom part of the radial adsorber 10 and passes through the adsorbent body 20, and the product exits in the upper part 2. During the regeneration, the regeneration fluid 3 goes in counter-currentwise via the top part and desorbs the impurities present in the adsorbent body 20, and the residual gas 4 exits in the bottom part.

The adsorber itself 10 is composed of a cylindrical shell having a vertical axis AA and of two ends. The adsorbent mass 20 is held in place by means of a perforated external screen 11 and of an internal screen 12, also perforated, which are attached, on the one hand, to the upper end and, on the other hand, to a solid metal sheet 13 in the lower part. The gas 1 moves vertically at the periphery in the external free region 14 between the cylindrical shell and the external screen, radially traverses the adsorbent body 20 and then moves vertically in the internal free region 15 before leaving the adsorber near the top. The regeneration is carried out in the reverse direction.

In the above description, the gas to be purified during the adsorption phase moves from the periphery toward the center: reference is then made to centripetal movement in adsorption. The corresponding regeneration is then carried out centrifugally, that is say from the center to the exterior. This is the most general configuration but radial adsorbers can be used in the same way with reverse directions of movement, that is to say that, for example in adsorption, the gas to be treated will go from the inside toward the outside, whereas, in regeneration, the regeneration gas will move from the outside toward the inside. Another possible arrangement consists in adding a circular leaktightness disk for dividing the adsorbent body into two parts. It is then possible, in one and the same radial adsorber, to have, for example in the adsorption phase, a centrifugal movement in a first volume of adsorbent, followed by a centripetal movement in the upper volume of adsorbent.

The adsorbent material relating to the invention 20 is composed of a homogeneous mixture half composed of particles of zeolite of LSX (Low Silica/Alumina ratio) type and half composed of zeolite of CaBaX type. (It relates to 50% by weight).

More specifically, the LSX is in the form of spherical beads with a diameter of between 1.9 mm and 2.15 mm and with a packed density of between 650 kg/m$^3$ and 665 kg/m$^3$.

The CaBaX is also in the form of spherical beads with a diameter of between 2 mm and 2.3 mm and with a packed density of approximately 700 kg/m$^3$. The degree of exchange both for calcium and for barium is 20% of the exchangeable cations. Except for the secondary compounds, this second adsorbent is thus a zeolite of the Na60; Ca20; Ba20 X type. These characteristics were measured on 5 samples taken from 5 different manufacturing batches for each of the adsorbents. The color of the two adsorbents s is slightly different, making it possible to visually locate each of the products. The mixing was carried out before filling in drums successively filled with 50% of LSX and then with 50% of CaBaX.

The drums are thus filled to approximately 80% of their maximum capacity and then the mixing is carried out in an industrial drum mixer which imposes off-center rotational movements on the drums. Small samples withdrawn before filling and during filling show the stability of the mixture. Visually, no segregation is demonstrated. This confirms the results of tests carried out in the laboratory. Particles which can have at most a diameter ratio of 1.21 and a density ratio of 1.08 form a stable mixture, provided that the transportation of the drums, the filling of the adsorber and the operating conditions of the unit are carried out according to the rules of the art.

The use of a 50/50 mixture makes it possible to target a very low residual content of $CO_2$, of less than 10 ppb, and degrees of catching of the order of 95% for the other impurities.

The use of just one of these adsorbents would make it possible to obtain the required specifications but at the price of a greater capital cost: greater volume of adsorbent, larger adsorber.

The use of a double bed would also make it possible to optimize the purification unit but at the price of increasing the complexity of the adsorber. The addition of a supplementary screen leads, in particular for the largest radial adsorbers, to crucial problems of implementation, in particular of successive attachment of the screens holding the adsorbents.

The choice of the optimum LSX/CaBaX distribution can be made from laboratory tests under the operating conditions but it can also preferably be made via adsorption simulation software as available commercially or as copiously described in the literature.

FIG. 1 describes the simplest radial adsorber with a single adsorbent material composed of equal parts by weight of particles of LSX and of CaBaX. With the same zeolite-based mixture, it is possible to use a double bed, preferably in this case a bed of activated alumina intended to catch the water and the composite zeolite-based bed. In an alternative form of the base case or of the double bed case, the zeolite-based material can consist of zeolite beads agglomerated from a mixture of powder formed of LSX and of CaBaX. Such a mixture should a priori be produced by the adsorbent supplier, who should preferably himself produce the two adsorbent entities.

The mixing of particles of adsorbents having different compositions requires the supplementary final mixing stage but offers greater flexibility of implementation. It can concern two adsorbents originating from different suppliers and the mixing can be carried out starting from commercial products in stock, this being done in any proportion.

For a further understanding of the nature and objects for the present invention, reference should be made to the detailed description, taken in conjunction with the accompanying drawing, in which like elements are given the same or analogous reference numbers and wherein:

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A zeolite-based adsorbent material composed of:
   a non-zero proportion by weight of a zeolite chosen from zeolites X or zeolites LSX; and
   the remainder of a non-zero proportion of a cation-exchanged zeolite, said cation-exchanged zeolite being chosen from cation-exchanged zeolites X or cation-exchanged zeolites LSX,
   wherein the cation-exchanged zeolite is exchanged from 10 to 90% by calcium cations and from 10 to 90% by barium cations.

2. The adsorbent material of claim 1, wherein the zeolites X or LSX and the cation-exchanged zeolites are uniformly or virtually uniformly distributed in said material.

3. An adsorber comprising an adsorbent material as defined in claim 1.

4. The adsorber of claim 3, wherein the adsorber is a radial adsorber.

5. The adsorber of claim 3, wherein the adsorber comprises a single bed of adsorbent material.

6. An adsorber, wherein the adsorber comprises a first bed which makes it possible to remove at least in part the water from a gas stream and a second bed comprising the adsorbent material as claimed in claim 1.

7. A process for the purification or separation of a gas or of a gas mixture using a zeolite-based adsorbent material as defined in claim 1.

8. The process of claim 7, wherein the gas is air.

9. The process of claim 7, wherein at least one impurity chosen from $CO_2$, ethylene, propane and $N_2O$ is removed.

10. The process of claim 7, wherein the process is a TSA process.

11. A process for the preparation of a zeolite-based adsorbent material composed of:
   a non-zero proportion by weight of a zeolite chosen from zeolites X or zeolites LSX; and
   the remainder of a non-zero proportion of a cation-exchanged zeolite, said cation-exchanged zeolite being chosen from cation-exchanged zeolites X or cation-exchanged zeolites LSX, wherein:
   (a) a zeolite X or LSX comprising sodium and/or potassium cations is subjected to at least one exchange of ions by bringing into contact with a solution comprising calcium and/or barium ions, (b) if necessary, stage (a) is repeated until the degree of exchange desired for each of said barium and calcium cations is achieved,
(c) crystals of zeolite X or LSX exchanged by calcium and barium cations are recovered;
(d) the crystals of zeolite X or LSX exchanged by calcium and barium cations resulting from stage (c) and crystals of zeolite X or LSX are agglomerated in order to form agglomerated particles, and
(e) a heat treatment is carried out in order to dry and activate said particles.

* * * * *